Figure 1:
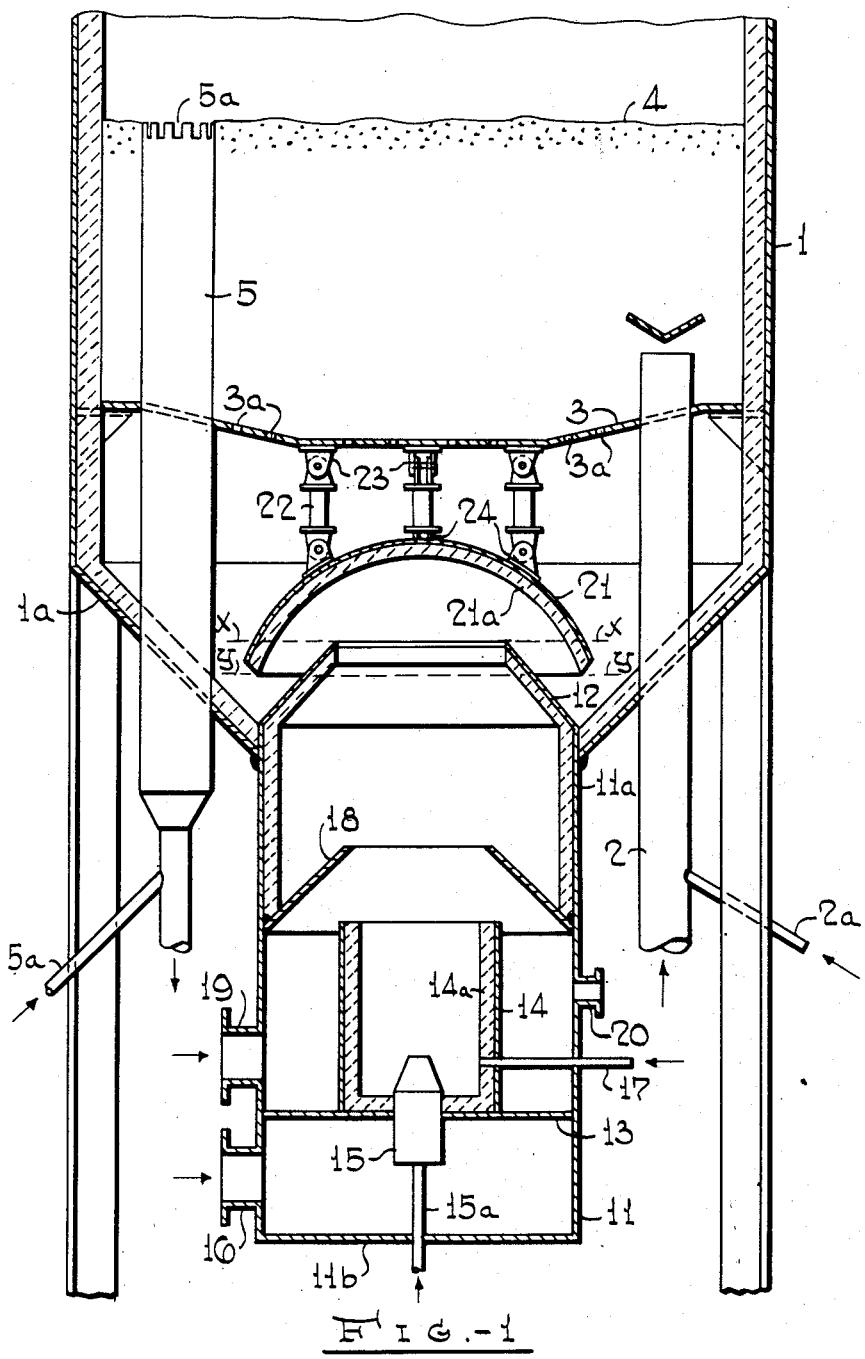

Dec. 15, 1953  J. W. PACKIE  2,662,813
REGENERATOR APPARATUS FOR FLUIDIZABLE SOLID MATERIALS
Filed June 23, 1951  2 Sheets-Sheet 1

John W. Packie Inventor
By W. O. T. Hilman Attorney

Patented Dec. 15, 1953

2,662,813

UNITED STATES PATENT OFFICE 2,662,813

REGENERATOR APPARATUS FOR FLUIDIZABLE SOLID MATERIALS

John W. Packie, Maplewood, N. J., assignor to Standard Oil Development Company, a corporation of Delaware Application June 23, 1951, Serial No. 233,228

5 Claims. (Cl. 23—288)

1

The present invention relates to apparatus for the handling of fluidizable, finely divided solid materials such as catalyst employed for the catalytic conversion of fluids including gases and vaporized liquid materials, and is a continuation-in-part of an application for United States Patent filed May 1, 1950 under the Serial Number 159,276 and issued as United States Patent No. 2,589,124 on March 11, 1952. The invention also relates to the handling of other finely divided solid materials such as may be employed in the thermal cracking of heavy carbonaceous materials including reduced crudes using inert solids as a heat transfer medium, or as in the treatment of mixed gaseous or liquid hydrocarbons with silica gel, activated charcoal, or other suitable solid adsorbents for the removal and recovery of any desired constituent, and as in the distillation of oil from oil shale, the carbonization of coal, the roasting of ores, the reduction of metal oxides, et cetera. More particularly, the invention relates to apparatus employed for the removal of contaminating materials from the finely divided solids used in processes of the character set forth, in which the contaminants are removed by combustion in the presence of an oxygen-containing gas. Such regeneration procedures including oxidation, reduction, sulfurization and other special treatments for the solid materials are typical in many of the processes mentioned, and normally may be performed substantially continuously during regular operation. The solids involved may be either catalytic or non-catalytic materials which require regeneration for continued use.

A typical example of the nature and functions of the apparatus and procedures involved according to this invention is to be derived from its employment in the catalytic cracking of hydrocarbon gases or vaporized liquids. In such a process, the finely divided solid catalyst material becomes contaminated with carbonaceous deposits which may reduce or entirely destroy the effectiveness of the catalyst. In order to revive the catalyst material, the carbonaceous deposits thereon must be removed. Usually this removal is most effectively accomplished by combustion of the deposits. To initiate this regeneration step, the finely divided solid catalyst material is introduced into an enlarged vessel and raised to a combustion temperature by the admission of heated atmospheric air and flue gases until the carbonaceous deposits are ignited. In the presence of an oxygen-containing gas such as atmospheric air, combustion normally will proceed spontaneously thereafter, so long as contaminated catalyst materials and the oxygen-containing gas continue to be introduced while removing regenerated materials from the reaction vessel.

The apparatus contemplated, while particularly adapted for such an operation, may be employed to equal advantage in any comparable system wherein a thermal reaction is required to be initiated in a reaction vessel of the character contemplated, or in which such a reaction is to be maintained, in the presence of an oxygen-containing gas.

Figure 2:
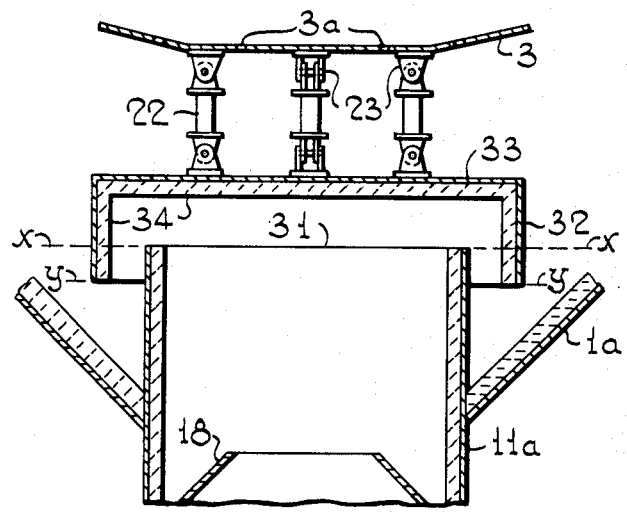
Figure 3:
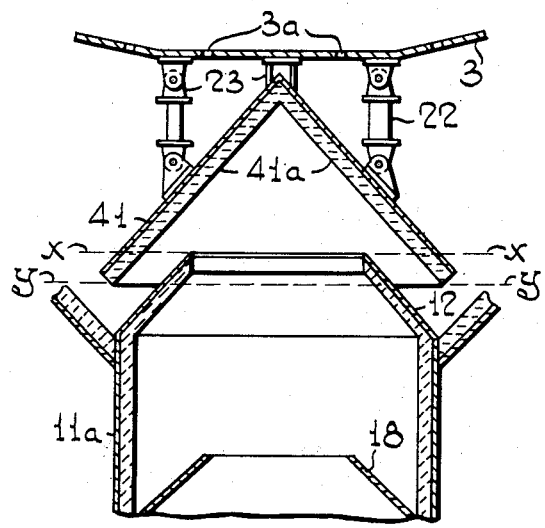

It is an object of the invention to provide such an apparatus in which the reaction vessel is integrated with a means not only for supplying heat for initiation of the reaction to take place within the vessel, but also to provide for introduction of the oxygen-containing gas required for maintenance of the reaction. The invention and its objects may be more fully understood by reference to the accompanying drawings in which Fig. 1 is a diagrammatic view, partly in section, of a regenerator vessel such as may be employed according to the invention, and including the combination therewith of a means for initially supplying heated oxygen-containing gases to the vessel and for subsequently introducing a suitable flow of such material into the vessel;

Fig. 2 is a vertical section through a portion of the apparatus according to Fig. 1, illustrating a modified form thereof; and Fig. 3 similarly illustrates still another variation of that structure.

In the drawings, like parts have been designated by the same numerals. The numeral 1 designates a regeneration vessel, having a lining 1a of a refractory material, such as is employed for regeneration of finely divided, solid catalyst materials used in the catalytic cracking of hydrocarbon fluids. In the structure shown, the numeral 2 designates a portion of an inlet conduit system for contaminated solid materials opening into the vessel at an intermediate point above the level of a grid plate 3, adapted to support a column of solid materials within the vessel with an upper level at some intermediate point in the vessel as indicated in the drawing, by the dotted line 4. The grid 3 may be of any conventional character although, as shown, it is a dished, perforated plate member, the perforations therein being shown and designated by the numeral 3a. The numeral 5 is applied to a portion of a conduit system for the withdrawal of regenerated solids from the vessel 1. The conduit 5 as shown extends upwardly through the lower portion of the vessel, and the grid or plate 3, terminating substantially at the level 4 at which the solid materials in the vessel are to be maintained. The conduit 5 is provided with a notched or slotted inlet portion 5a. Each of the conduits 2 and 5 may be provided with suitable aeration taps such as conduit means 2a and 5a to permit introduction of a gaseous material as required to maintain fluidization of the finely divided solid material passed through conduits 4 and 5.

Integrated with the structure of the regenerator vessel 1 is a means for introducing hot gaseous materials as required to initiate the reaction to take place within the vessel, and also for the introduction of gaseous materials such as may be required to maintain the reaction. As shown, this means is an auxiliary burner unit, of substantially conventional form, comprising a cylindrical casing 11, at least partially lined with a refractory material 11a, and having a hollow frusto-conical upper end portion 12 which extends through the bottom wall of the vessel 1 into the space defined between said wall and the lower surface of the grid 3. In addition to the refractory liner material 11a shown in the upper end of the casing 11, the burner unit is provided interiorly with a lateral partition 13 disposed at an intermediate level within the casing 11, and in spaced relation to the lower end wall 11b thereof. Supported on the upper surface of the partition 13 is a combustion chamber formed by a casing 14 lined with a refractory material 14a. The chamber is disposed substantially concentrically of the casing 11 in radially spaced relation thereto, an annular space or passageway being provided between the respective casing walls 14 and 11. A fuel burner element 15 extends through the partition 13 and the lower wall of the combustion chamber opening into the chamber. Gaseous or liquid fuel is supplied to the burner as by means of a conduit connection 15a, while primary air for combustion of the fuel is supplied to the element 15 by way of a conduit connection 16 opening into the chamber formed between the lower end wall 11b of casing 11 and the lower surface of the partition 13. Means such as igniter 17 extending through the walls of the casing 11 and the combustion chamber is provided for ignition of the fuel and air introduced by way of the burner unit. Reflector or baffle means such as the hollow frusto-conical member 18 is provided at substantially the level of the upper end of the combustion chamber extending upwardly therefrom. The conduit connection 19 opening into the annular space formed between the combustion chamber and the casing 11 provides for introduction of a gaseous material required to maintain the reaction in vessel 1, and for fluidization of the materials therein. The auxiliary burner unit being combined with the reaction vessel 1, as a substantially integral part thereof, the need for separate mounting or support means is largely avoided. Also, by the combination disclosed, the need for extensive conduit connections, including expansion joints and other special equipment is eliminated. The conduit connection 20 is provided as a safety feature for the introduction of an inert gaseous material in the event of failure of the air supply to through lines 16 and 19.

Within the chamber formed between the grid plate 3 and the lower wall of the vessel 1, a deflector cap member is disposed substantially concentrically over the nozzle end portion 12 of the auxiliary burner extending into the chamber. As shown, this cap is formed by a substantially spherically shaped casing section 21 lined with a refractory material 21a, and is disposed with reference to the upper end of the nozzle portion in close vertically spaced relation to provide a sealing zone defined in the drawing by the parallel dotted lines x—x and y—y between the lower edge portion of the cap member and the upper edge portion of the nozzle member. This zone normally should be not less than 8 inches deep and is preferably a maximum dimension as may be permitted by the structural form of the elements involved. The lower edge portion of the cap member also is disposed in substantially closely spaced relation to the inner surface of the lower wall of the vessel 1, and in such relation thereto and to the nozzle 12 as to permit the discharge of gases therethrough with a linear velocity of from about 30 to about 60 ft. per second, while permitting maintenance of a minimum velocity therethrough sufficient for maintenance of the sealing function of the relationship. This minimum velocity may be about 5 to 10 feet per second under normal operating conditions. For example, in a structure in which the exterior diameter of the auxiliary burner at the junction of the nozzle member 12 therewith is 5 ft. and the nozzle outlet is approximately 32 inches, the cap member 21 may have a diameter at the lower edge portion substantially equal to that of the auxiliary burner casing, being disposed over the nozzle 12 so as to be spaced therefrom at its closest point as well as from the wall of the vessel 1 at a distance of approximately 4 inches, and to provide a passage between the respective elements have a total area of about 800 square inches.

The cap member is preferably suspended from a support element within the chamber formed between the lower wall of the vessel and the grid plate 3. As shown, the cap member is supported from the lower surface of the grid plate itself as by means of rigid support elements 22 pivotally connected at each end between paired, spaced lugs 23 and 24 attached respectively to the lower surface of the grid plate 3 and the upper surface of the cap member 21. This arrangement of the supports 22 and the lugs 23 and 24 is such as to prevent substantial lateral movement of the cap with reference to the nozzle 12. In the event it is desired to omit the grid plate 3, the cap member may be supported otherwise, as from rods or similar elements disposed transversely of the vessel.

In operation of the apparatus described, as in its employment with the catalytic cracking of hydrocarbon gases or vaporized liquids, for the removal of contaminating materials from the catalyst, the vessel 1 normally will form part of a catalyst circulation system receiving contaminated catalyst materials from a cracking zone and discharging regenerated catalyst for return thereto. In initiating operation of the system, the fuel burner 15 is first ignited, and a flow of an oxygen-containing gas, such as air introduced by way of the conduit 19. The air, heated in the auxiliary burner 11, combined with flue gases from fuel burned in the combustion chamber 14 is passed into the vessel 1, heating the vessel. If desired, the hot gases and air may be passed from vessel 1 through the conduit 5 and circulated through the remainder of the system in order to raise the temperature of the system. Conventional means, not shown, will be provided for the release of such gases from the vessel 1 and otherwise from the system as required. Operation of the burner is continued until the temperature of the vessel 1 is raised sufficiently to ignite and maintain combustion of the contaminant materials which may be contained on the catalyst materials supplied to the vessel 1 by way of the conduit 2. Such temperature may be in the range of from about 900° F. to about 1250° F., and normally from about 1100° F. to about 1150° F.

When the vessel 1 has reached an operating temperature, in a system such as that now contemplated, the fresh feed catalyst may be initially charged by introducing it through the conduit 2, and overflowing the catalyst from the vessel 1 through the conduit 5 to charge the cracking reactor, not shown. Once the cracking reaction has been initiated, the conduit 2 may be employed to introduce contaminated catalyst into the regenerator vessel 1, catalyst regenerated therein being returned to the cracking reaction zone by way of conduit 5. Aeration taps such as conduit members 2a and 5a may be employed to maintain fluidization of the catalyst material in transit. Fuidization of the body of material in vessel 1 is maintained by the flow of gas introduced through the grid plate 3.

Once the combustion of contaminant materials has been initiated in vessel 1, it will proceed spontaneously for as long as the oxygen-containing gas is supplied to the vessel in quantities sufficient to support the combustion of contaminant materials on the catalyst fed therein through conduit 2. As soon as this reaction is under way, the fuel burner 15 may be extinguished, and only the flow of oxygen-containing gas through conduit 19 continued. As previously indicated, this flow should be sufficient not only to support combustion of the catalyst contaminants, but also to maintain the finely divided solid catalyst materials supplied to vessel 1 in a substantially fluidized condition, and in view of pressure drop through the grid 3, sufficient to prevent catalyst reflux through the grid openings so as to maintain the space below the grid substantially free of finely divided solid materials. It is contemplated, however, that the apparatus and method of procedure according to the present invention will provide an additional safeguard against entrance of catalyst materials into the auxiliary burner unit. This is accomplished by the provision of a trapped portion between the cap 21 and the nozzle 12 of the burner 11, cooperating with the adjoining walls of the vessel, which portion is substantially disposed between the upper edge of the nozzle and the lower edge of the cap. Where the grid plate 3 may be omitted, as previously mentioned, the trapped portion or passageway will be of additional importance in preventing back flow of finely divided solids from the vessel 1 into the burner 11. Should the normal flow of air through lines 16 and 19 fail, an inert gaseous or vaporous material such as steam, may be introduced by way of the line 20, sufficient to maintain a minimum flow velocity of from about 5 to about 10 feet per second through the trapped portion provided between the cap 21 and nozzle 12. The cap structure as illustrated and described herein, further provides a shield for the grid plate 3 against direct contact by hot gases from the burner 11, and against radiant heat from the combustion chamber 14.

Normally the vessel 1 will be operated under a pressure of from about 6 to about 15 pounds per square inch gauge, but for certain processes, the pressure in the regenerator vessel may be considerably higher, up to about 100 pounds per square inch, or even more. The level of the finely divided solid materials in vessel 1 will be determined by the level of the upper end of the discharge conduit 5, and as additional contaminated material is introduced by way of conduit 2, an equivalent amount of regenerated material will be discharged by way of conduit 5. The slotted or notched portion 5a, of the conduit 5, provides for a smoother rate of withdrawal of the solid material permitting slight variation in the level 4 without large fluctuations in the rate at which the solids are withdrawn.

Figs. 2 and 3 illustrate variations of the form and arrangement of the structure as shown in Fig. 1 and particularly these figures illustrate possible variations in the form of the cap member provided for the outlet of the auxiliary burner 11. As shown in Fig. 2, the frusto-conical end portion 12 of the burner 11 illustrated in Fig. 1 is omitted, the upper cylindrical portion of the burner 11 extending directly into the space below the grid 3 with an unrestricted open end 31. In this form the cap member is shaped to conform with the open end portion 31, thereby acquiring a substantially cylindrical or cup-shaped form consisting of a side wall portion 32 and an end wall portion 33 with a refractory lining 34. The cap member, as illustrated, is of sufficiently greater diameter than the end portion 31 of the burner 11 so as to provide the desired flow velocity between them. The depth of the wall portion 32 is sufficient to provide the trapped area referred to in relation to the structure according to Fig. 1. In the apparatus as illustrated by Fig. 3, the nozzle outlet 12 of Fig. 1 is retained, but the cap member is a cone-shaped member 41 having a refractory lining 41a. In all other respects, the spacing and disposition of the member 41 is substantially comparable to that of the member 21 of Fig. 1. Likewise, the operation as carried out when employing either the cap member and burner structure of Fig. 2 or of Fig. 3 is in every way comparable to that described with reference to Fig. 1.

What is claimed is:

1. In a system of the character described, the combination of a reaction vessel and a means for heating the vessel and for supplying gaseous reactant materials thereto, comprising a reaction vessel having a bottom end wall, a hollow casing member mounted substantially integrally with said end wall, dependent therefrom below the vessel and with an upper end portion extending vertically through said end wall, said portion terminating within the vessel beyond said wall, a fuel burner within said casing including a combustion chamber and means for supplying fuel and combustion air thereto, separate conduit means for passing a stream of an oxygen-containing gas through said casing, an outlet from said casing through the upper end thereof opening upwardly within said vessel, and a cap member for said casing outlet suspended in said vessel concentrically with the casing, in vertically spaced relation to said outlet, a peripheral edge portion on said cap substantially enclosing the upper end of said casing in radially spaced relation thereto, and forming therewith a downwardly opening annular passageway between said cap and casing.

2. An apparatus according to claim 1, in which the upper end of said casing is a hollow frusto-conical member providing an outlet of restricted cross sectional area.

3. An apparatus according to claim 1, in which said cap member is a hollow spherical zone section.

4. An apparatus according to claim 1, in which said cap member consists of a flat, circular plate element, and a cylindrical wall portion peripherally dependent therefrom.

5. An apparatus according to claim 1, in which said cap member is a hollow cone-shaped member.

JOHN W. PACKIE.

References Cited in the file of this patent

UNITED STATES PATENTS

| Number    | Name   | Date          |
|-----------|--------|---------------|
| 1,641,053 | Sauer  | Aug. 30, 1937 |
| 2,398,228 | Hunt   | Apr. 9, 1946  |
| 2,420,049 | Martin | May 6, 1947   |
| 2,548,642 | White  | Apr. 10, 1951 |